(12) United States Patent
Boyle (10) Patent No.: US 8,655,722 B1
(45) Date of Patent: *Feb. 18, 2014

(54) ANONYMOUS REWARDS CLUB PROGRAM (71) Applicant: Joingo, LLC, San Jose, CA (US)

(72) Inventor: Stephen S. Boyle, Lincoln, CA (US)

(73) Assignee: Joingo, LLC, San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/912,195

(22) Filed: Jun. 7, 2013

Related U.S. Application Data (63) Continuation of application No. 13/620,720, filed on Sep. 15, 2012, now Pat. No. 8,463,645.

(60) Provisional application No. 61/600,578, filed on Feb. 17, 2012.

(51) Int. Cl.
G06Q 30/00 (2012.01)
G06Q 30/02 (2012.01)

(52) U.S. Cl.
CPC ........ G60Q 30/0226 (2013.01); G06Q 30/0237 (2013.01)
USPC .................................... 705/14.27; 705/14.37

(58) Field of Classification Search
CPC .................................. G06Q 30/0226
USPC ....................................................... 705/14.27
See application file for complete search history.

(56) References Cited

U.S. PATENT DOCUMENTS

| | | | |
|---|---|---|---|
| 7,200,578 B2 | 4/2007 | Paltenghe et al. | |
| 2005/0187873 A1* | 8/2005 | Labrou et al. | 705/40 |
| 2008/0052244 A1 | 2/2008 | Tsuei et al. | |
| 2008/0188308 A1* | 8/2008 | Shepherd et al. | 463/39 |
| 2008/0262920 A1 | 10/2008 | O'Neill et al. | |
| 2009/0287562 A1 | 11/2009 | Bosch et al. | |
| 2011/0131108 A1 | 6/2011 | Doxey | |
| 2011/0302016 A1 | 12/2011 | Haddad | |

* cited by examiner

Primary Examiner — John G Weiss
Assistant Examiner — Scott C Anderson
(74) Attorney, Agent, or Firm — Clause Eight IPS; Michael Catania (57) ABSTRACT A method and system for rewarding anonymous patrons of an anonymous loyalty program is disclosed herein. The anonymous loyalty program only uses an identification generated on a mobile communication device for all transactions by the member. The member does not need to disclose his or her phone number to participate in the anonymous loyalty program although the member's mobile communication device is used for all of the transactions.

11 Claims, 13 Drawing Sheets

FIG. 1

| Name | ID_Code | Account_No | Point_Value | Level_ID |
|---|---|---|---|---|
| Anon | 7609798765 | 3CD0F8078564 | 1,250,970 | 6 |
| Anon | 6156347756 | 14741174A536 | 1,080,770 | 5 |
| Anon | 8586352241 | 30694B0096F3 | 978,505 | 5 |
| Anon | 4089456344 | 3CD0F854BA87 | 917,070 | 5 |
| Anon | 7608157960 | 002374121A90 | 856,900 | 4 |
| Anon | 6695145523 | 000FBB476344 | 775,940 | 4 |
| Anon | 4159079987 | 001CFB0B0898 | 770,815 | 4 |
| Anon | 9492415432 | 405FBE945407 | 545,970 | 3 |
| Anon | 6198079876 | 00211E5250A3 | 398,755 | 2 |
| Anon | 4082452424 | 403CFC9476A1 | 225,755 | 2 |

ANONYMOUS REWARDS CLUB PROGRAM

CROSS-REFERENCES TO RELATED APPLICATIONS

The present application is a continuation application of U.S. patent application Ser. No. 13/620,720, filed on Sep. 15, 2012, which claims priority to U.S. Provisional Patent Application No. 61/00578, filed on Feb. 17, 2012, now abandoned, both of which are hereby incorporated by reference in their entireties.

STATEMENT REGARDING FEDERALLY SPONSORED RESEARCH OR DEVELOPMENT

Not Applicable

BACKGROUND OF THE INVENTION

1. Field of the Invention

The present invention generally relates to rewards club programs.

2. Description of the Related Art

The prior art has disclosed various rewards programs such as gambling rewards clubs, frequent flier programs, and grocery store shopping programs.

Paltenghe, et al, U.S. Pat. No. 7,200,578, for a Method And System For Anonymizing Purchase Data discloses anonymizing purchase data from consumers for selective organization, access to and use of personal data.

Tsui, et al., U.S. Patent Publication Number 20080052244 for an Anonymous Transaction Authentication discloses a method and system for a merchant to authenticate customer information without the customer being revealed.

Bosch et al., U.S. Patent Publication Number 20090287562, for an Anonymous Merchant-Customer Loyalty Rewards Program, discloses a system and method for rewarding an anonymous merchant-customer for performing transactions on a defined set of merchant debit-machines.

Doxey, U.S. Patent Publication Number 20110131108 for an Internet Loyalty And Rewards System discloses a system where a member's information is sent directly to a rewards server without an affiliate having an access to the information.

General definitions for terms utilized in the pertinent art are set forth below.

GSM, Global System for Mobile Communications is a second generation digital cellular network.

Code Division Multiple Access ("CDMA") is a spread spectrum communication system used in second generation and third generation cellular networks, and is described in U.S. Pat. No. 4,901,307.

Long Term Evolution ("LTE") is a next generation communication network.

Interactive voice response ("IVR") is a telephone technology in which a user uses a phone to interact with a database to acquire information.

Short Message Service ("SMS") is text messaging communication using a mobile phone or other device to send messages up to 160 characters in length.

Multimedia messaging service ("MMS") communication is a communication transmitted to and from a mobile phone that includes a multimedia content such as a digital photograph (JPEG), videos, and the like.

A SMS Gateway is used to send text messages with or without a mobile phone, and is used by aggregators to forward text messages to mobile phones.

BLUETOOTH technology is a standard short range radio link that operates in the unlicensed 2.4 gigaHertz band.

Mobile Originated ("MO") is a text message that is sent from a mobile phone.

Mobile Terminated ("MT") is a text message that is sent to a mobile phone.

Public Switch Telephone Network ("PSTN") is a telecommunication system in which networks are inter-connected to allow telephones to communicate with each other throughout the world.

Telephone Consumer Protection Act ("TCPA") of 1991 restricts the use of SMS text messages received by mobile phones, and SMS messages sent without a consumer's consent can violate the TCPA.

APP is a software application for a mobile phone such as a smart phone.

Hypertext Transfer Protocol ("HTTP") is a set of conventions for controlling the transfer of information via the Internet from a web server computer to a client computer, and also from a client computer to a web server.

Internet is the worldwide, decentralized totality of server computers and data-transmission paths which can supply information to a connected and browser-equipped client computer, and can receive and forward information entered from the client computer.

FTP or File Transfer Protocol is a protocol for moving files over the Internet from one computer to another.

Short message peer-to-peer ("SMPP") is a telecommunications protocol for exchanging SMS messages between SMS peer entities.

Simple object access protocol ("SOAP") is a computer network protocol for exchanging information.

Simple mail transfer protocol ("SMTP") is a delivery protocol for email.

Transfer Control Protocol/Internet Protocol ("TCP/IP") is a protocol for moving files over the Internet.

A SMS aggregator is an entity that provides connectivity with a mobile phone carrier by offering a SMS gateway to send and receive messages and other digital content.

Application Programming Interface (API) is a collection of computer software code, usually a set of class definitions, that can perform a set of related complex tasks, but has a limited set of controls that may be manipulated by other software-code entities. The set of controls is deliberately limited for the sake of clarity and ease of use, so that programmers do not have to work with the detail contained within the given API itself.

Direct Inward Dialing ("DID") involves a carrier providing one or more trunk lines to a customer for connection to the customer's private branch exchange ("PBX") and a range of telephone lines are allocated to this line.

Voice over Internet Protocol ("VoIP") relates to communications transmitted over the Internet such as SKYPE.

URL or Uniform Resource Locator is an address on the World Wide Web.

User Interface or UI is the junction between a user and a computer program. An interface is a set of commands or menus through which a user communicates with a program. A command driven interface is one in which the user enter commands. A menu-driven interface is one in which the user selects command choices from various menus displayed on the screen.

Web-Browser is a complex software program, resident in a client computer, that is capable of loading and displaying text and images and exhibiting behaviors as encoded in HTML (HyperText Markup Language) from the Internet, and also from the client computer's memory. Major browsers include MICROSOFT INTERNET EXPLORER, NETSCAPE, APPLE SAFARI, MOZILLA FIREFOX, and OPERA.

Web-Server is a computer able to simultaneously manage many Internet information-exchange processes at the same time. Normally, server computers are more powerful than client computers, and are administratively and/or geographically centralized. An interactive-form information-collection process generally is controlled from a server computer, to which the sponsor of the process has access.

CRM (Customer Relationship Management) is a widely-implemented strategy for managing a company's interactions with customers, clients and sales prospects. CRM involves using technology to organize, automate, and synchronize business processes and the like—principally sales activities, but also business processes and the like for marketing, customer service and technical support.

Wireless Application Protocol ("WAP") is an open, global specification that empowers users with mobile wireless communication devices (such as mobile phones) to easily access data and to interact with Websites over the Internet through such mobile wireless communication device. WAP works with most wireless communication networks such as CDPD, CDMA, GSM, PDC, PHS, TDMA, FLEX, reflex, iDEN, TETRA, DECT, DataTAC, Mobitex and GRPS. WAP can be built on most operating systems including PalmOS, WINDOWS, CE, FLEXOS, OS/9, JavaOS and others.

WAP Push is defined as an encoded WAP content message delivered (pushed) to a mobile communication device which includes a link to a WAP address.

BRIEF SUMMARY OF THE INVENTION

The present invention provides a member of rewards program with greater control over his or her participation in the rewards program. The rewards program is an anonymous loyalty program. The present invention allows the member to decide which participating entities in the rewards program to access and where to access rewards points without having to provide the anonymous loyalty program with information about the member. The member only need an identification code associated with a mobile communication device of the member. For example, if the anonymous loyalty program is for a gambling rewards program, the member may want to remain anonymous and not have a record of gambling expenditures associated with his or her name. The present invention allows the member to acquire rewards points for the anonymous loyalty program without providing profile information including his or her name. The present invention further allows the member to redeem reward points in an anonymous manner.

The present invention allows a member to be judged by the anonymous loyalty program only on his or her expenditure of resources (time or money). In this manner, the value of the members to the anonymous loyalty program is equalized, and the consideration for participating in the anonymous loyalty program is only the resources expended by each member.

One aspect of the present invention is an anonymous loyalty program system. The system preferably includes multiple mobile communication devices, a loyalty program server, multiple loyalty sites and a rewards server. Each of the mobile communication devices is associated with an anonymous end-user and each mobile communication device comprises a mobile resident software application that uses an identification code to allow participation by the end user in an anonymous loyalty program without additional information from the end user. The loyalty program server comprises a database with a plurality of participant accounts. Each of the participant accounts is identified only by the identification code associated with each mobile communication device of the mobile communication devices. Each of the loyalty sites comprises a scan code comprising an identifier code for the loyalty site. The scan code is scanned by a mobile data capable communication device of an end user when the end user purchases a good or service from a loyalty site to generate a rewards message comprising the identifier code for the mobile communication device and purchase amount for the good or service. The rewards server is in communication with each of the loyalty sites, the loyalty program server and each of the mobile communication devices to transmit each of the reward messages to the loyalty program server for rewarding of loyalty points to each of the participant accounts and for transmission of reward communications to each of the mobile data capable communication devices.

Another aspect of the present invention is anonymous loyalty program system. The system includes multiple mobile communication devices a loyalty program server, a plurality of loyalty sites, and a rewards server. Each of the plurality of mobile communication devices is associated with an anonymous end-user member of the anonymous loyalty program. Each mobile communication device comprises a mobile resident software application that scans an identification code associated with a loyalty program to allow participation by the end user in an anonymous loyalty program without additional information from the end user. The loyalty program server comprises a database with a plurality of participant accounts. Each of the participant accounts is identified only by the identification code associated with each mobile communication device of the plurality of mobile communication devices. Each of the plurality of loyalty sites comprises a scan code comprising an identifier code for the loyalty site. The scan code is scanned by a mobile communication device of an end user when the end user purchases a good or service from a loyalty site to generate a rewards message comprising the identifier code for the mobile data capable communication device and purchase amount for the good or service. The rewards server is in communication with each of the plurality of loyalty sites, the loyalty program server and each of the plurality of mobile communication devices in order to transmit each of the plurality of reward messages to the loyalty program server for rewarding of loyalty points to each of the participant accounts and for transmission of reward communications to each of the plurality of mobile communication devices.

Having briefly described the present invention, the above and further objects, features and advantages thereof will be recognized by those skilled in the pertinent art from the following detailed description of the invention when taken in conjunction with the accompanying drawings.

DETAILED DESCRIPTION OF THE INVENTION

Figure 1:
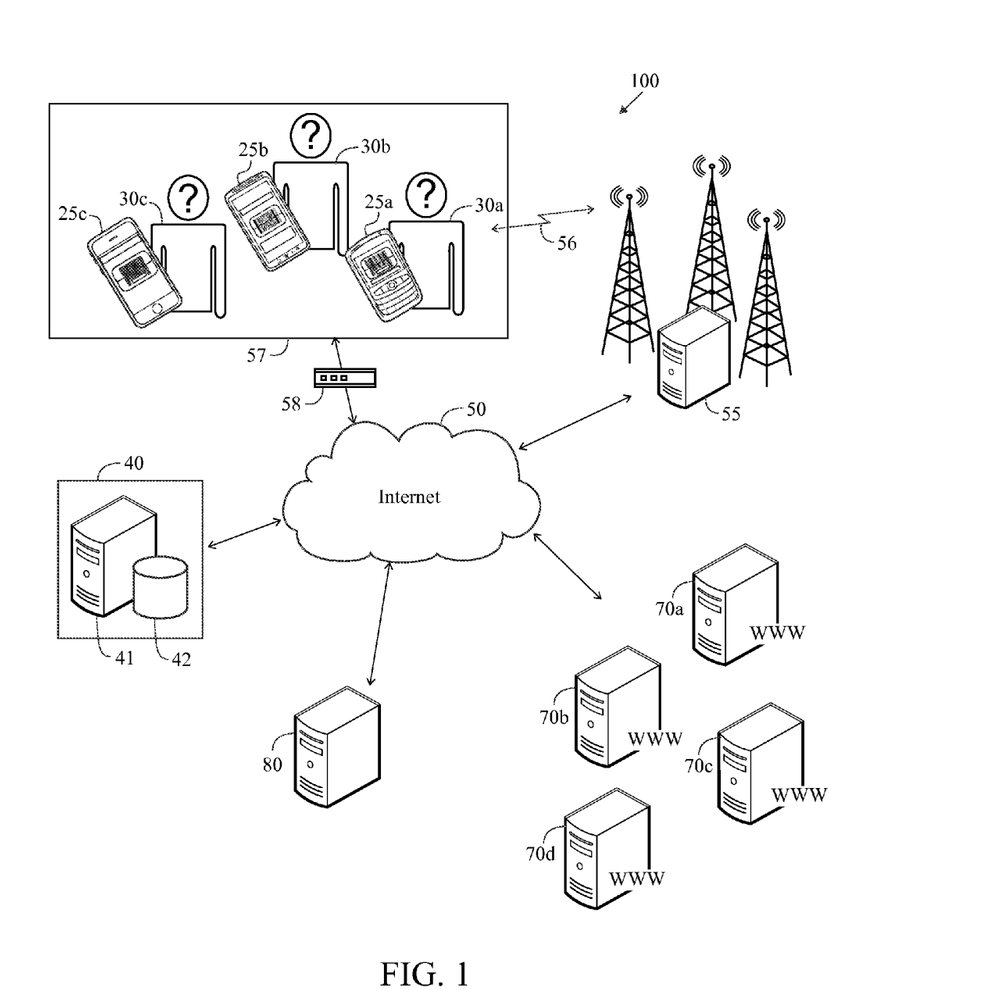
FIG. 1 is a block diagram of a system for an anonymous loyalty program.

As shown in FIG. 1, a system for an anonymous loyalty program of an enterprise is generally designated 100. The system 100 is preferably comprised of a multiple mobile communication devices 25a, 25b 25c, a network 50, a rewards server 80, multiple loyalty sites 70a, 70b, 70c and 70d, a loyalty program server 41 with a CRM database 42 at an enterprise site 40. The mobile communication devices 25a, 25b and 25c belong to members 30a, 30b and 30c in the anonymous loyalty program. The members 30a, 30b and 30c, are at a loyalty program facility 57 and have access to the network 50 through a wireless access point 58. The system 100 can also include a communications network server 55 that transmits over a communication network 56 of a mobile communication service provider.

The enterprise can be any type of organization that desires to reward customers, engage customers, conduct a mobile marketing campaign or similar mobile marketing program to customers. The enterprise can be a casino organization like Hard Rock, Harrahs, MGM's and the like. The enterprise can be a business like Exxon, Apple, Nordstrom or the like. The enterprise can be a non-profit or charity, like the American Red Cross. The enterprise can be a government agency like FEMA. The enterprise can be a political party. The enterprise can be an organization like the American Medical Association. Those skilled in the pertinent art will recognize other types of enterprises that can use the present invention.

The mobile communication devices utilized with the present invention preferably include mobile phones, smartphones, tablet computers, PDAs and the like. Examples of smartphones include the IPHONE® smartphone from Apple, Inc., BLACKBERRY® smartphones from Research In Motion, the DROID® smartphone from Motorola Mobility Inc., and many more. Examples of tablet computing devices include the IPAD® tablet from Apple Inc., and the XOOM™ tablet from Motorola Mobility Inc.

Each of the interface descriptions preferably discloses use of at least one communication protocol to establish handshaking or bi-directional communications. These protocols preferably include but are not limited to XML, HTTP, TCP/IP, Serial, UDP, FTP, Web Services, WAP, SMTP, SMPP, DTS, Stored Procedures, Import/Export, Global Positioning Triangulation, IM, SMS, MMS, GPRS and Flash. The databases used with the system preferably include but are not limited to MSSQL, Access, MySQL, Progress, Oracle, DB2, Open Source DBs and others. Operating system used with the system preferably include Microsoft 2010, XP, Vista, 200o Server, 2003 Server, 2008 Server, Windows Mobile, Linux, Android, Unix, I series, AS 400 and Apple OS.

The underlying protocol at a server, is preferably Internet Protocol Suite (Transfer Control Protocol/Internet Protocol ("TCP/IP")), and the transmission protocol to receive a file is preferably a file transfer protocol ("FTP"), Hypertext Transfer Protocol ("HTTP") or other similar protocols. The transmission protocol ranges from SIP to MGCP to FTP and beyond. The protocol at the server is preferably HTTP.

A mobile communication service provider (aka phone carrier) of the customer such as VERIZON, AT&T, SPRINT, T-MOBILE, and the like mobile communication service providers, provide the communication network for communication to the data capable communication device of the customer.

Figure 7:
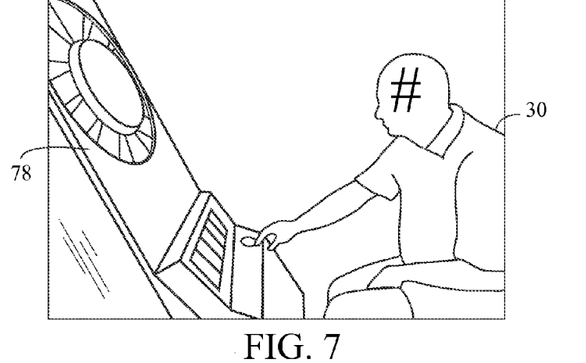
FIG. 7 is an illustration of a gambler playing a slot machine for reward points in an anonymous loyalty program.
Figure 7A:
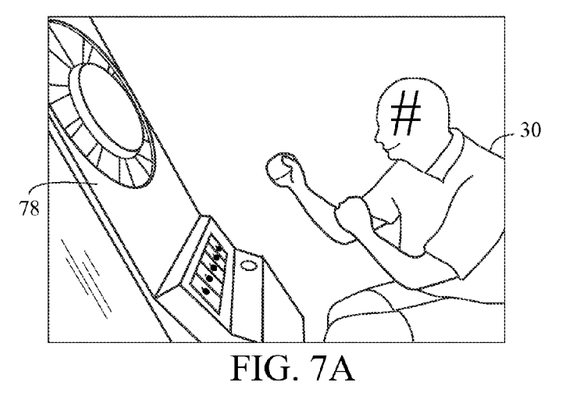
FIG. 7A is an illustration of a gambler winning at a slot machine while participating in an anonymous loyalty program.
Figure 7B:
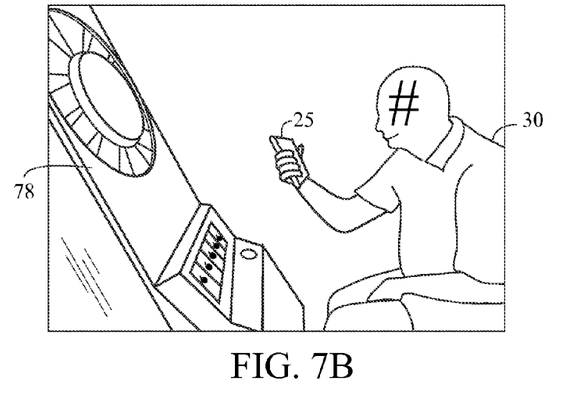
FIG. 7B is an illustration of a gambler receiving reward points in an anonymous loyalty program.

As shown in FIG. 7, a member of an anonymous loyalty program for a casino plays a slot machine. The member is only known by the number of his mobile communication device. In FIG. 7A, the member wins at the slots. In FIG. 7B, the member confirms on his mobile communication device that he has been credited rewards points for his time spent at the slot machine.

Figure 3:
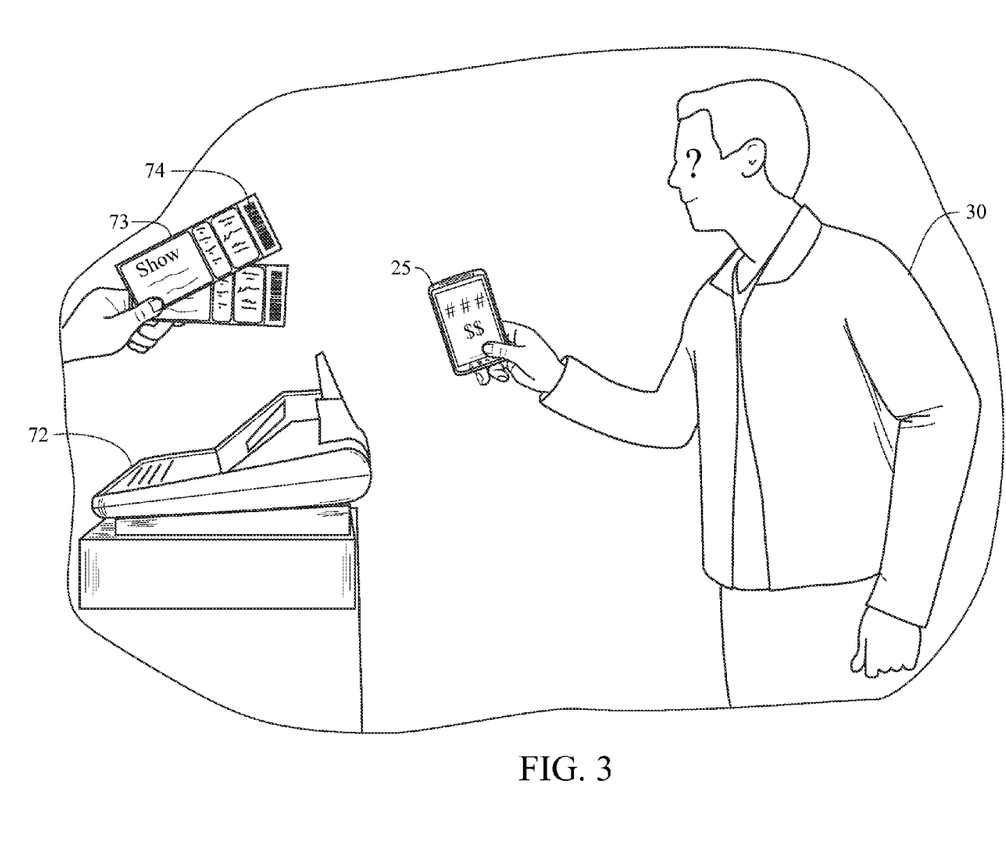
FIG. 3 is an illustration of a member of an anonymous loyalty program redeeming points for tickets from a participating retailer of the anonymous loyalty program.

As shown in FIG. 3, a member of an anonymous loyalty program redeems his rewards points for an item of value. In this case, the item of value is two tickets to a show. The member is able to redeem his points by using the number associated with his mobile communication device.

Figure 6:
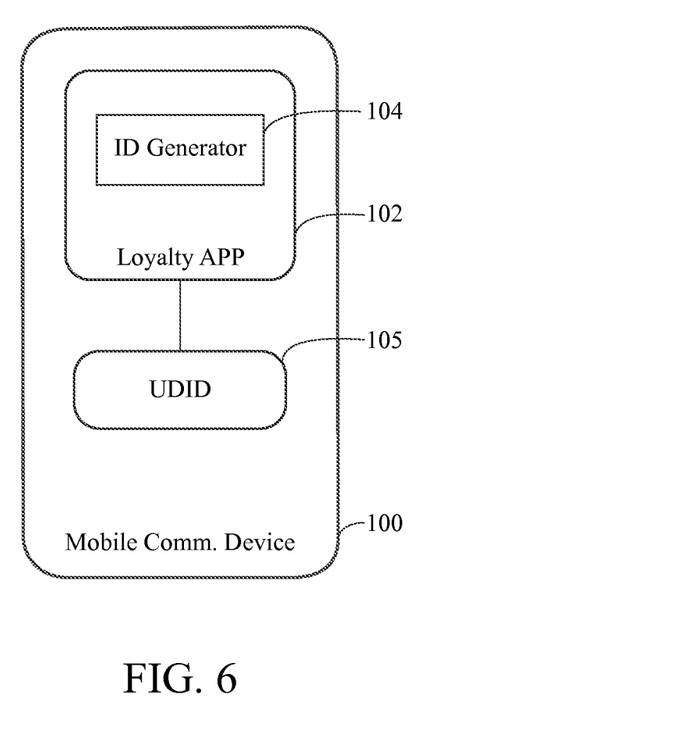
FIG. 6 is an illustration of an identification generation function of a mobile communication device, which in one embodiment generates the identification for the member of anonymous loyalty program.

As shown in FIG. 6, a mobile communication device 100 comprises a loyalty app 102 which has been uploaded to the mobile communication device 100 to reside in a memory of the mobile communication device 100. The loyalty app has an ID generator engine 104 for generating an identification code for use with the anonymous loyalty program. In one preferred method, the identification is generated based on a UDID number 105 from the mobile communication device 100 and a number associated with the loyalty app 102. In this manner, a unique identification code is generated for use by the anonymous patron in participating in the anonymous loyalty program. The identification code is transmitted to a rewards server over a network, which establishes an account associated with the identification code in a CRM database of a loyalty server.

On an IPHONE® device from Apple, Inc., the "UDID," or Unique Device Identifier is a combination of forty numbers and letters, and is set by Apple and stays with the device forever.

On an ANDROID based system, one that uses Google Inc.'s ANDROID operating system, the ID is set by Google and created when a user first boots up the device. The ID remains the same unless the user does a "factory reset" of the phone, which deletes the phone's data and settings.

Those skilled in the pertinent art will recognize other identifications, (e.g. MEID) associated with mobile communication devices which can be used to generate an identification for use by anonymous patron in participating in the anonymous loyalty program.

The identification code for the anonymous loyalty program generated is utilized to collect rewards points and to redeem rewards point from the anonymous loyalty program.

In one embodiment, the participating loyalty site has a QRC code that is scanned by a QRC reader associated with a loyalty program app on the mobile communication device of the anonymous patron of the anonymous loyalty program. This QRC code preferably comprises a code associated with the participating loyalty site, and this data along with the identification code of the anonymous patron is transmitted to a rewards server, which eventually transmits the data to a CRM database at a loyalty server in order to allocate rewards points for the anonymous patron in an account associated with the identification code for expending resources at the participating loyalty site.

In another embodiment, the participating loyalty site has a receiver means for receiving the identification code from the mobile communication device of the anonymous patron. The transfer of the identification code from the mobile communication device to the receiver may be by means of BLUETOOTH transmission, RFID, a QRC code on the display of the mobile communication device which comprises the identification code and which is scanned by the receiver of the participating loyalty site, a SMS text, typed in by the patron, or by other known means. The participating loyalty site then sends the information to a rewards server in order to allocate rewards points for the anonymous patron in an account associated with the identification code for expending resources at the participating loyalty site.

In redeeming rewards points, a similar process is followed wherein the identification code is provided to a participating loyalty site to acquire goods or services using rewards points.

In this manner, patron of the anonymous loyalty program remains anonymous while participating in the rewards program.

Further, anonymous patron's value to the anonymous loyalty program is based on the expenditures of the patron at participating loyalty sites. Additionally, in the case of services or goods that may be culturally unacceptable, the patron knows that the anonymous loyalty program does not maintain personal information and thus the anonymous patron may expend greater resources (time and money) than if the identity of the patron was known.

Figure 2:
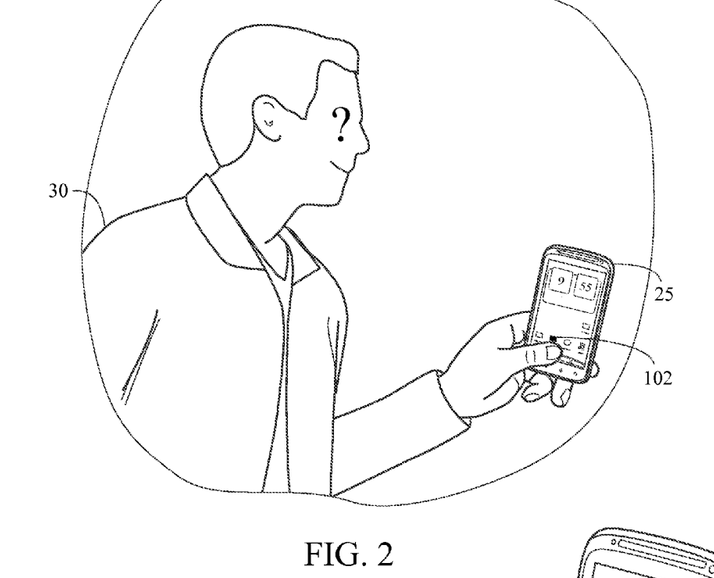
FIG. 2 is an illustration of a member accessing a mobile application for an anonymous loyalty program on his mobile communication device.
Figure 2A:
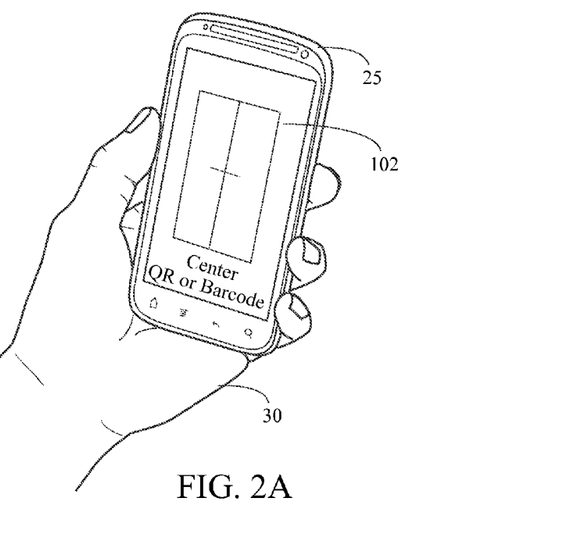
FIG. 2A is an isolated view of a mobile communication device accessing a QRC scanner application of an anonymous loyalty program mobile application.
Figure 4:
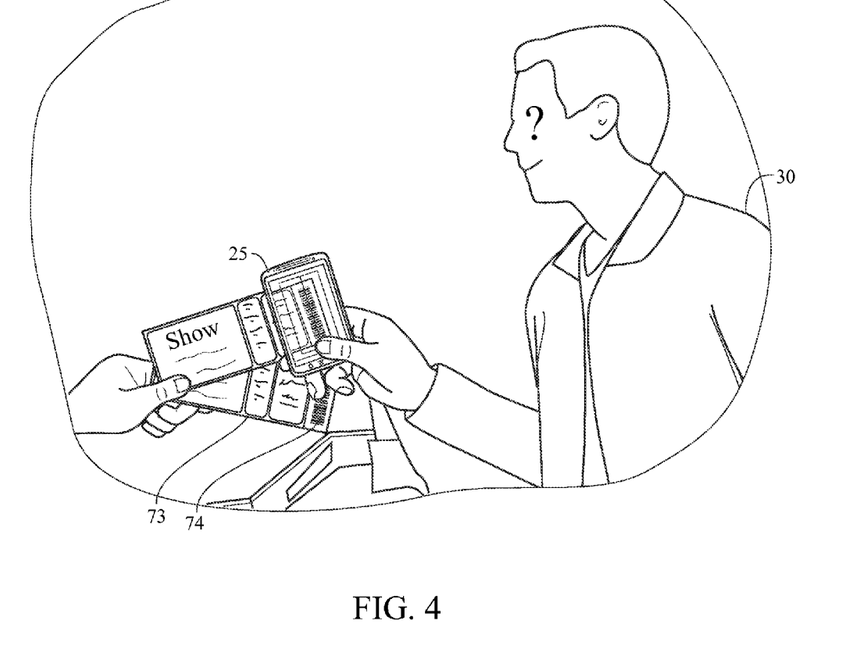
FIG. 4 an illustration of a member of an anonymous loyalty program scanning, with a QRC scanner of a mobile application of the mobile communication device, the tickets redeemed from a participating retailer of the anonymous loyalty program with points from the member's account in the anonymous loyalty program.

As shown in FIG. 2, a member 30 accesses an anonymous loyalty program mobile application 102 on his mobile communication device 25. The mobile application 102 is preferably an application downloaded from the loyalty program site through a mobile browser on the mobile communication device 25. As shown in FIG. 2A, the anonymous loyalty program mobile application preferably includes a QRC scanner function or other barcode scanner function in order to scan QR codes or barcodes from participating retailers in the anonymous loyalty program. The scanning function is used to redeem points for rewards such as tickets, as shown in FIG. 4. This is all accomplished without the identity of the member 30 being known by the anonymous loyalty program. Thus, the member 30 can acquire points and redeem points without his or her identity or his or her phone number being known by the anonymous loyalty program. Thus, when the member 30 decides to terminate his or her relationship with the anonymous loyalty program, the member 30 does not need to worry about information being retained by the anonymous loyalty program.

Figure 1A:
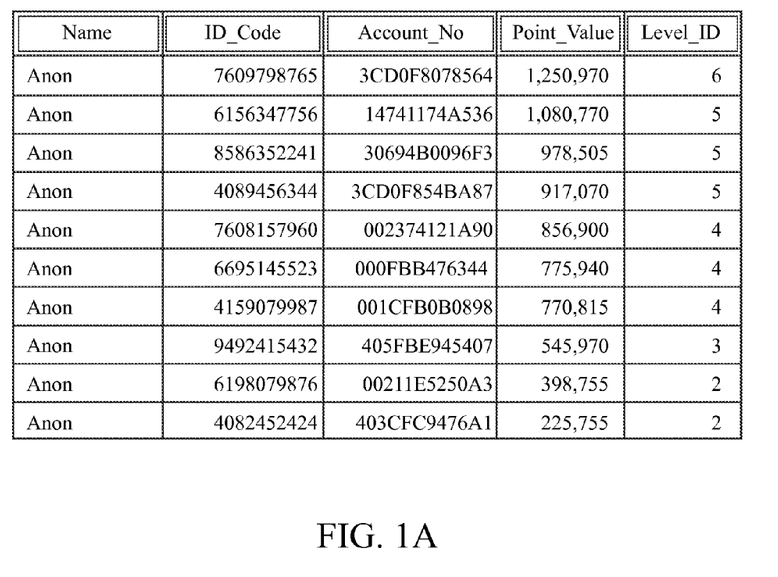
FIG. 1A is a table of a list of member's of an anonymous loyalty program including an identification code, a loyalty program account number, individual member point values and membership levels.
Figure 5:
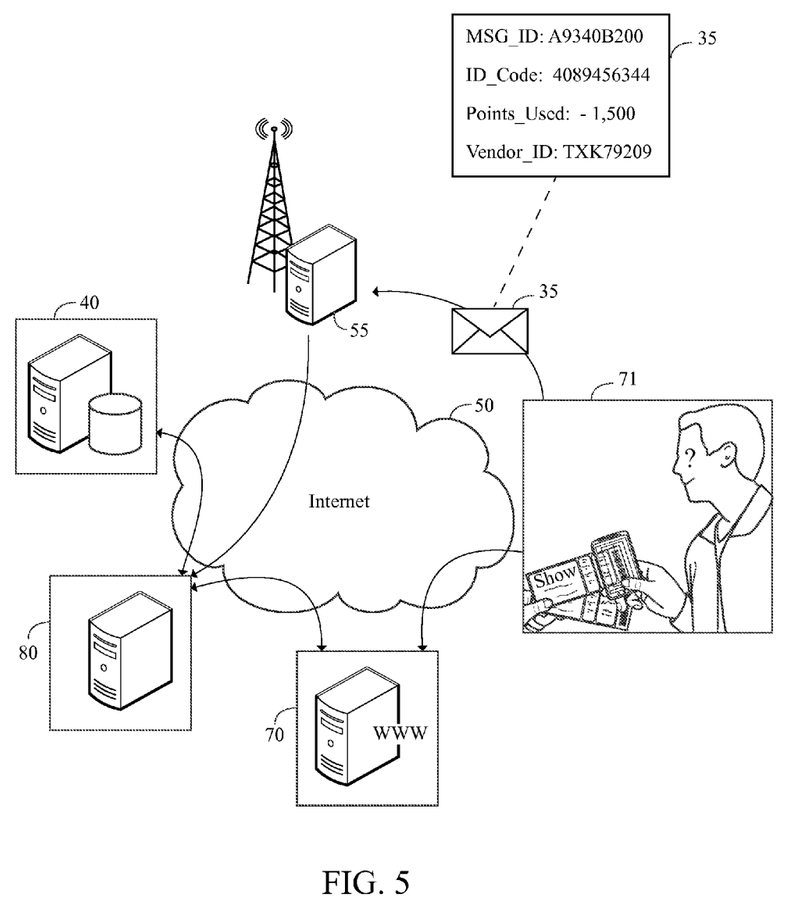
FIG. 5 is a block diagram of a system for an anonymous loyalty program illustrating the transmissions related to the purchase of tickets from a participating retailer of the anonymous loyalty program which result in points accrued by the member of the anonymous loyalty program.

As shown in FIG. 5, an anonymous member 30 uses the anonymous loyalty program mobile application on his mobile communication device 25 to redeem points for tickets at a facility 71 of a participating retailer in the anonymous loyalty program. A message 35 containing a message identification, the member's identification for anonymous loyalty program, the points used and the vendor's identification. The message is preferably sent over a communication network to a communication network server 55 and then sent over the internet 50 to a rewards server 80. The rewards server 80 communicates over the internet with the loyalty site 70 to confirm the redemption of tickets by the member 30. The rewards server 80 also communicates with the loyalty program server 41 at the enterprise site 40 to adjust the member's account in the CRM database 42. Sample accounts maintained for members at the CRM database 42 are shown in FIG. 1A. The accounts only have an anonymous identification code associated with the account number. As discussed, the anonymous identification code is the only relationship the member 30 has with the anonymous loyalty program. Once the member 30 terminates his or her membership in the anonymous loyalty program, the account is terminated and the information is destroyed. However, the ex-member does not need to worry about information being retained since the ex-member provided very little information to the anonymous loyalty program. Most importantly, the ex-member never had to disclose his or her phone number even though the ex-member was able to use his or her mobile communication device for all of the transactions for the anonymous loyalty program.

Figure 8:
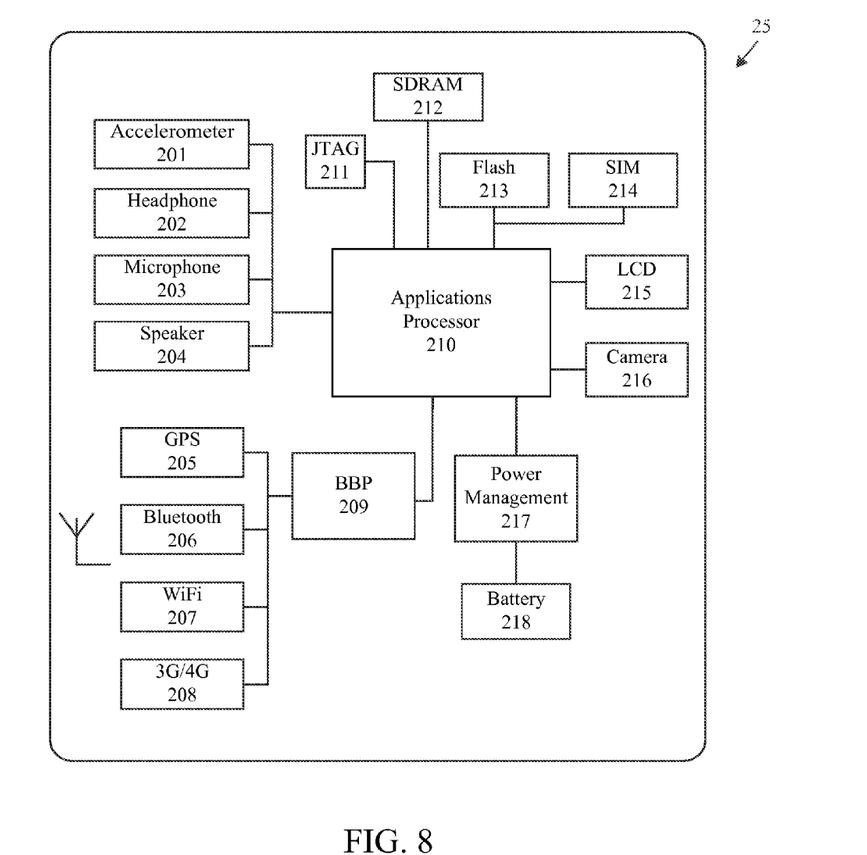
FIG. 8 is a block diagram of components of a mobile phone.

As shown in FIG. 8, a typical mobile communication device 25 includes an accelerometer 201, a head phone 202, a microphone 203, a speaker 204, a GPS chipset 205, a Bluetooth component 206, a WiFi component 207, a 3G/4G component 208, a BaseBand Processor (for radio control) 209, an applications processor 210, a JTAG (debugger) 211, a SDRAM memory 212, a Flash memory 213, SIM card 214, LCD display 215, a camera 216, a power management circuit 217 and a battery or power source 218.

Figure 9:
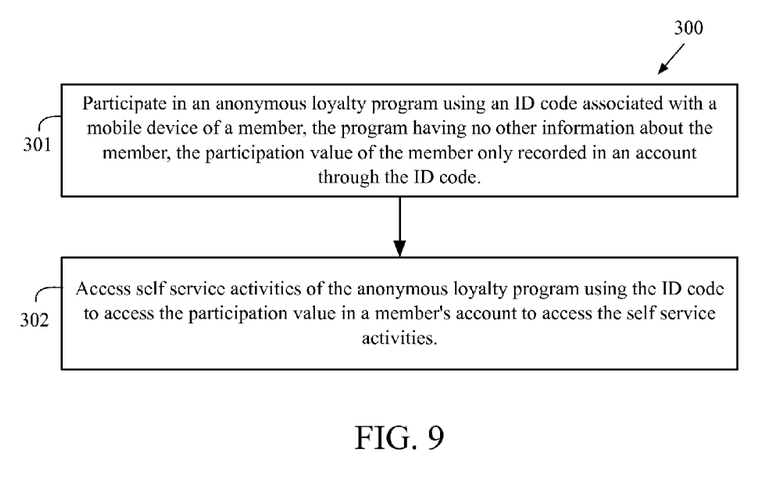
FIG. 9 is a flow chart for a method for participating in an anonymous loyalty program.

A method 300 for rewarding members of an anonymous loyalty program is shown in FIG. 9. At block 301, a patron participates in an anonymous loyalty program using an identification code associated with a mobile device of a member. The participation value of the member in the anonymous loyalty program is only recorded in an account through the identification code, and the anonymous loyalty program has no information about the member. At block 302, the patron accesses self service activities of the anonymous loyalty program using the identification code to access the participation value in an account of the member to access the self service activities.

Figure 10:
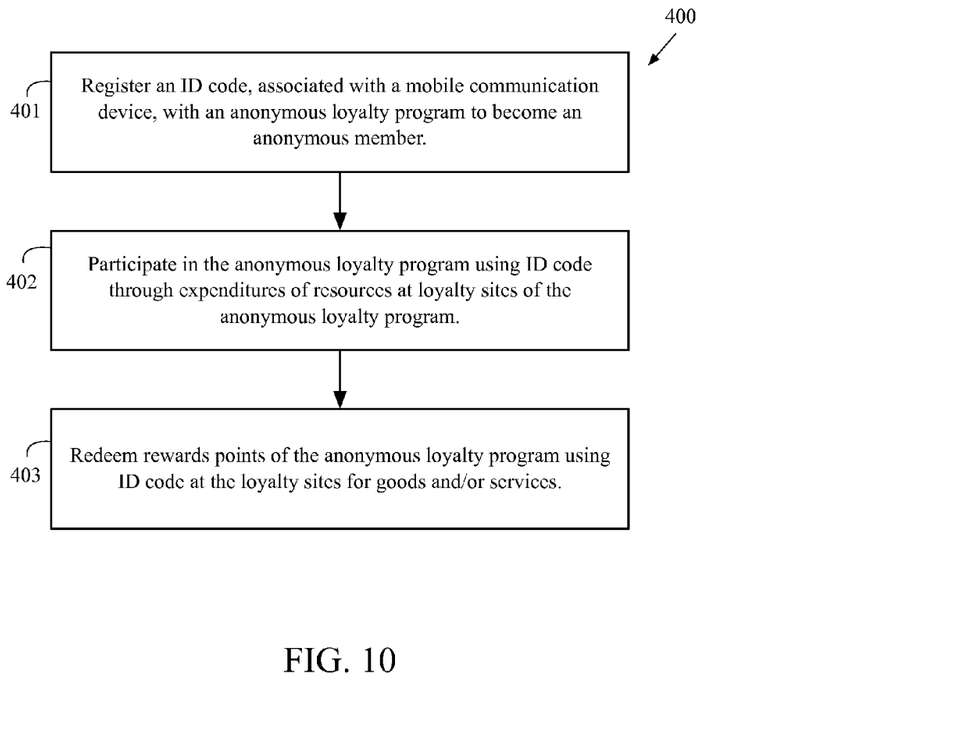
FIG. 10 is a flow chart for a method for participating in an anonymous loyalty program.

A method 400 for participating in an anonymous loyalty program is shown in FIG. 10. At block 401, a patron registers an identification code with an anonymous loyalty program to become a member of the anonymous loyalty program. The identification code is associated with a mobile communication device, but not the phone number of the device. At block 402, the patron participates in the anonymous loyalty program using an identification code associated with a mobile device through expenditures of resources at a plurality of loyalty sites of the anonymous loyalty program. At block 403, the patron redeems a plurality of rewards points of the anonymous loyalty program using the identification code at the plurality of loyalty sites of the anonymous loyalty program for a plurality of goods and/or services.

Figure 11:
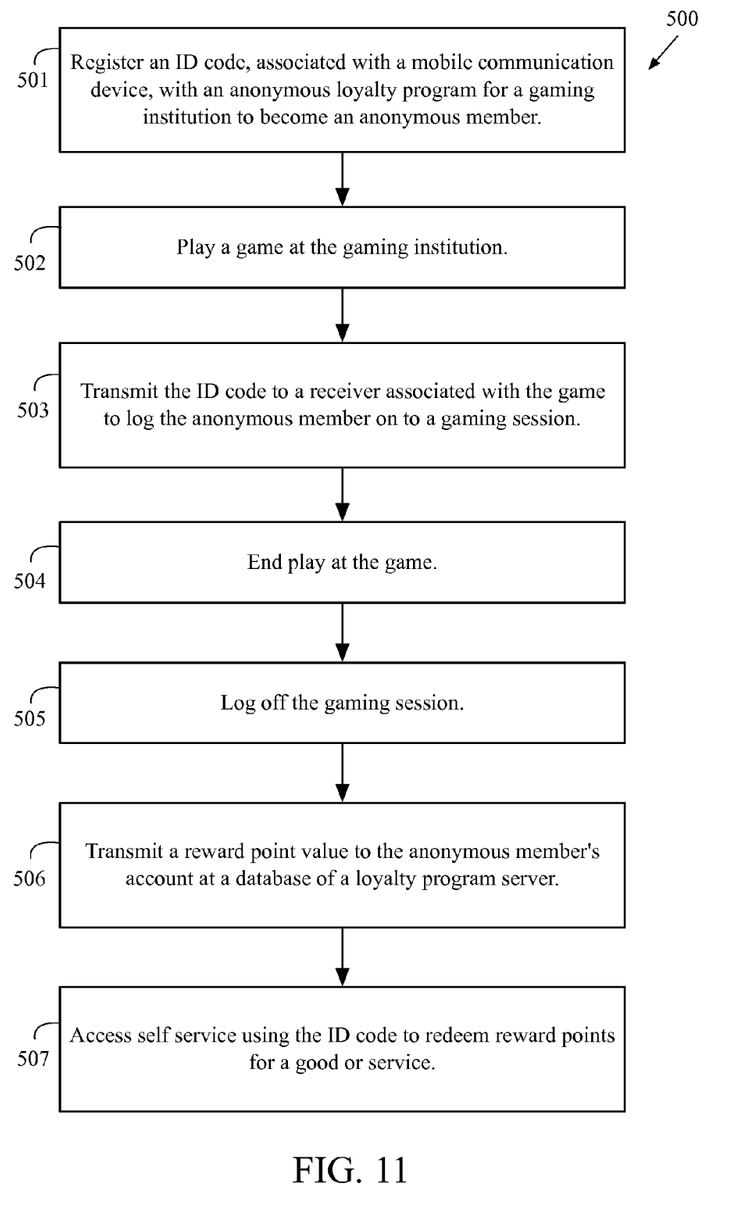
FIG. 11 is a flow chart for a method for participating in an anonymous loyalty program.

A method 500 for participating in an anonymous loyalty program for a gaming institution is shown in FIG. 11. At block 501, a patron registers an identification code with an anonymous loyalty program for a gaming institution to become an anonymous member of the anonymous loyalty program for a gaming institution. The identification code is associated with a mobile communication device but not the phone number of the device. At block 502, the patron plays a game at the gaming institution. At block 503, the identification code is transmitted to a receiver associated with the game to log the anonymous member on to a gaming session. At block 504, the patron ends play at the game of the gaming institution. At block 505, the patron logs off the gaming session. At block 506, a reward point value is transmitted to an account for the anonymous member at a database of a loyalty program server. At block 507, the patron accesses a self service at the gaming institution using the identification code to redeem reward points for a good or service.

Figure 12:
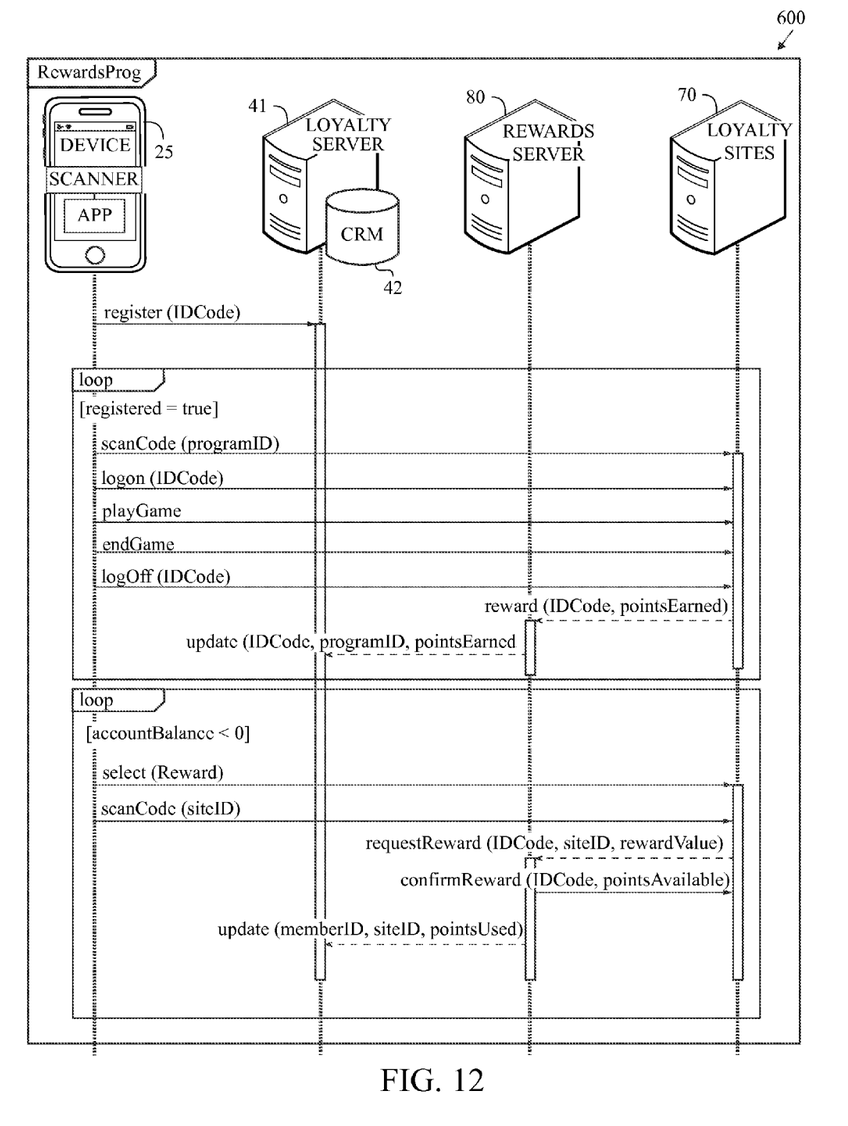
FIG. 12 is a sequence diagram for an anonymous loyalty program.

FIG. 12 is a sequence diagram RewardsProg 600 of a preferred embodiment of an anonymous loyalty program. An anonymous member accesses the anonymous loyalty program mobile application on the mobile communication device 25. The mobile application registers the member anonymously by using an identification code associated with a mobile communication device of the member.

Participating in an anonymous loyalty program of a loyalty site 70 is shown in a loop, which continues as long as the member is registered and participates. The member scans the loyalty program's identification using the mobile device 25. The mobile application transmits the member's ID code to logon and begin playing a game. The member ends the game and logs off his ID code from the game. The loyalty program transmits a reward point value and the member ID to the rewards server 80. The rewards server 80 also communicates with the loyalty program server 41 to adjust the member's account in the CRM database 42.

Accessing self-service activities of a loyalty site 70 is shown in a loop, which continues as long as the member's account has a balance over zero. The member selects a reward from the loyalty site 70. The site's scan code is scanned by the mobile communication device 25 of the member when purchasing the reward to generate a message to send to the rewards server 80 comprising the member's anonymous ID code, the loyalty site's ID code, and the reward value. The rewards server 80 communicates with the loyalty site 70 to confirm the redemption of the reward. The rewards server 80 forwards the updated information to the account for the anonymous member at a database 42 of a loyalty program server 41.

From the foregoing it is believed that those skilled in the pertinent art will recognize the meritorious advancement of this invention and will readily understand that while the present invention has been described in association with a preferred embodiment thereof, and other embodiments illustrated in the accompanying drawings, numerous changes modification and substitutions of equivalents may be made therein without departing from the spirit and scope of this invention which is intended to be unlimited by the foregoing except as may appear in the following appended claim. Therefore, the embodiments of the invention in which an exclusive property or privilege is claimed are defined in the following appended claims.

I claim as my invention:

1. A method for rewarding members of an anonymous loyalty program, the method comprising:
    registering an identification code with a loyalty program server of an anonymous loyalty program for a gaming institution to become an anonymous member of the anonymous loyalty program for a gaming institution, the identification code allows participation by the anonymous patron in an anonymous loyalty program without additional information from the anonymous patron, the identification code based on an unique device identifier number for a mobile phone of the anonymous patron and a number associated with a mobile resident software application on the mobile phone, the mobile resident software application associated with the anonymous loyalty program;
    playing a game at the gaming institution;
    transmitting the identification code to a receiver associated with the game to log the anonymous member on to a gaming session;
    ending play at the game of the gaming institution;
    logging off the gaming session;
    transmitting a reward point value to a rewards server, the rewards server in communication with the loyalty program server and the plurality of mobile phones, the rewards server configured to transmit a plurality of reward messages to the loyalty program server for rewarding of loyalty points to an account for the anonymous patron at a database of a loyalty program server; and
    accessing a self service at the gaming institution using the identification code to redeem reward points for a good or service.

2. The method according to claim 1 wherein the self service activities comprise a plurality of goods and services of a plurality of loyalty sites of the anonymous loyalty program.

3. The method according to claim 1 further comprising accounting for the plurality of reward points in a file associated with the identification code at a database of a loyalty program server.

4. The method according to claim 1 further comprising downloading the mobile resident software application to the mobile phone.

5. An anonymous loyalty program system comprising:
    a plurality of mobile communication devices, each of the plurality of mobile communication devices associated with an anonymous patron and each mobile communication device comprising a mobile resident software application that uses an identification code to allow participation by the anonymous patron in an anonymous loyalty program without additional information from the anonymous patron, the identification code based on an unique device identifier number for the mobile communication device and a number associated with the mobile resident software application;
    a loyalty program server comprising a database with a plurality of participant accounts, each of the participant accounts identified only by the identification code associated with each mobile communication device of the plurality of mobile communication devices;
    a plurality of loyalty sites, each of the plurality of loyalty sites comprising a scan code comprising an identifier code for the loyalty site, the scan code scanned by a mobile communication device of an anonymous patron when the anonymous patron purchases a good or service from a loyalty site to generate a rewards message comprising the identifier code for the mobile communication device and purchase amount for the good or service; and
    a rewards server in communication with each of the plurality of loyalty sites and the loyalty program server to transmit each of the plurality of reward messages to the loyalty program server for rewarding of loyalty points to each of the participant accounts.

6. The system according to claim 5 wherein each of the plurality of mobile communication devices is a mobile phone or a tablet computer.

7. The system according to claim 5 further comprising a network.

8. The system according to claim 5 wherein the mobile resident software application of the mobile communication device is configured to allow the anonymous patron to access services using rewards points.

9. An anonymous loyalty program system for gaming, the system comprising:

a plurality of mobile data capable communication devices, each of the plurality of mobile data capable communication devices associated with an anonymous end-user and each mobile data capable communication device comprising a mobile resident software application that generates an identifier code associated with the mobile data capable communication device to allow participation by the end user in an anonymous loyalty program without additional information from the end user;

a loyalty program server comprising a database with a plurality of participant accounts, each of the participant accounts identified only by the identification code associated with each mobile data capable communication device of the plurality of mobile data capable communication devices;

a plurality of gaming sites, each of the plurality of gaming sites comprising a scan for an identifier code to be scanned from a mobile data capable communication device of an end user when the end user accesses a gaming service or good from a gaming site to generate a rewards message comprising the identifier code for the mobile data capable communication device and a gaming value for the good or service, wherein the gaming value comprises a time value for a time period at the gaming site, a spend amount at the gaming site, or a game location; and a rewards server in communication with each of the plurality of gaming sites, the loyalty program server and each of the plurality of mobile data capable communication devices to transmit each of the plurality of reward messages to the loyalty program server for rewarding of loyalty points to each of the participant accounts and for transmission of reward communications to each of the plurality of mobile data capable communication devices.

10. The system according to claim 9 wherein each of the plurality of mobile communication devices is a mobile phone or a tablet computer.

11. The system according to claim 9 further comprising a network.

\* \* \* \* \*